July 24, 1962     B. VISSERS     3,046,025
APPARATUS FOR SPREADING PULVERIZED OR GRANULAR FERTILIZERS
Filed Oct. 28, 1960

INVENTOR
BASTIAAN VISSERS
BY Emery L. Groff
Emery L. Groff Attys

United States Patent Office 3,046,025
Patented July 24, 1962

3,046,025
APPARATUS FOR SPREADING PULVERIZED
OR GRANULAR FERTILIZERS
Bastiaan Vissers, Nieuw Vennep, Netherlands, assignor to Landbouwwerktuigen- en Machinefabriek H. Vissers N.V., Nieuw Vennep, Netherlands
Filed Oct. 28, 1960, Ser. No. 65,814
Claims priority, application Netherlands Nov. 26, 1959
1 Claim. (Cl. 275—7)

This invention relates to an apparatus for spreading pulverized or granular fertilizers, which is provided with a hopper supported by a travelling frame and from which the fertilizer is discharged through a spout located below said hopper and extending opposite to the travelling direction of the frame and having one or more holes in its side walls, said spout being angularly reciprocated in transverse direction.

With an apparatus of this kind the fertilizer is discharged through the lateral holes of the spout in more or less directed jets, so that it is not uniformly spread on the ground.

The invention has for its object to improve an apparatus of this kind in such a manner that the fertilizer may be spread uniformly over a large area. According to the invention a baffle plate is providing on both sides of the spout at some distance therefrom at the place of one or more lateral holes of the spout. As the fertilizer discharged from the spout strikes against said plate it is uniformly spread.

Said baffle plates may be stationary and secured to the travelling frame of the machine, so that the spout reciprocates between said plates, but preferably the plates are secured to the spout. With said arrangement the plates located on both sides of the spout may form part of a metal band extending along the open discharge end of the spout.

The invention will be further described with reference to the accompanying drawing illustrating an embodiment of the apparatus according to the invention.

In the drawing FIG. 1 is an elevation of the hopper and the spout partly in section.

Figures 1, 3:
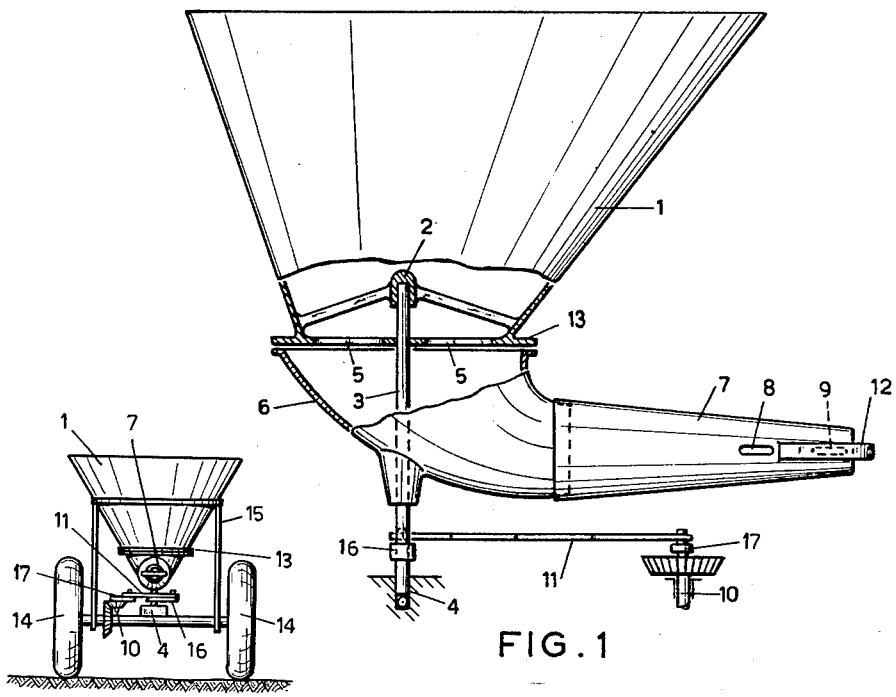
FIG. 3 is a rear view of the apparatus on a smaller scale.
Figure 2:
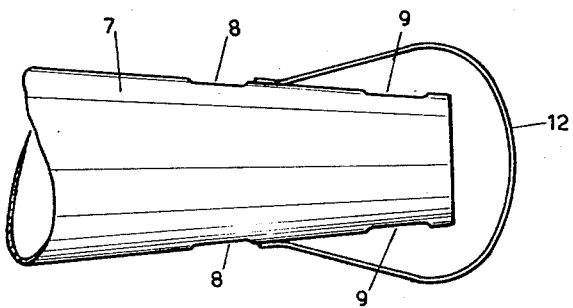
FIG. 2 is a plan view of the discharge end of the spout on a larger scale.

The hopper 1, which contains the fertilizer to be spread, carries in its lower part a bearing 2 for receiving the upper end of a vertical shaft 3, which at its lower end 4 is supported in a frame 15 provided with ground wheels 14. Secured to the lower end of the hopper 1 is a disc 13 having passages 5. Below the hopper 1 a bowl 6 is mounted, which is provided with a spout 7 having at both sides discharge holes 8 and 9 and is also open at its end face. The bowl 6 with its spout is secured on the shaft 3 driven by a crank 17 secured on a shaft 10 and connected by a rod 11 to a lever 16 secured on the shaft 3 of the bowl 6.

The open discharge mouth of the spout 7 is provided with baffle means comprising a band 12, having its ends secured to the wall of the spout. Said band 12 extends along the lateral holes 9 of the spout so that the fertilizer discharged by said holes and by the open mouth of the spout strikes against the band 12 and is spread thereby.

What I claim is:

In mobile apparatus for spreading pulverized fertilizers, the combination comprising a fertilizer receiving hopper, a frame supporting said hopper, a spout located below said hopper and extending opposite to the direction of travel of said frame, said spout having at least one outlet orifice in its side walls and an open discharge end, means for angularly reciprocating said spout in a transverse direction, baffle means provided on both sides of the spout, said baffle means comprising a band whose end portions are secured to opposite sides of said spout, the medial portion of said band overlying and spaced from the open discharge end of said spout, said band positioned opposite to and spaced from said outlet orifice whereby the fertilizer discharged through said orifice strikes said band and is uniformly distributed.

References Cited in the file of this patent

UNITED STATES PATENTS

| 935,734 | Bessen | Oct. 5, 1909 |
| 2,594,798 | Poe | Apr. 29, 1952 |
| 2,844,914 | Finn | July 29, 1958 |
| 2,993,699 | Van Der Lely et al. | July 25, 1961 |

FOREIGN PATENTS

| 556,676 | Belgium | Apr. 30, 1957 |